United States Patent
Diebold et al.

(10) Patent No.: US 7,987,031 B2
(45) Date of Patent: Jul. 26, 2011

(54) DEVICE FOR DETERMINING A TENDENCY TO TILT

(75) Inventors: Jürgen Diebold, Eschborn (DE); Stefan Stölzl, Weinheim (DE); Helmut Fennel, Bad Soden (DE); Michael Klug, Langen (DE)

(73) Assignee: Continental Teves AG 7 Co., OHG, Frankfurt (DE)

( * ) Notice: Subject to any disclaimer, the term of this patent is extended or adjusted under 35 U.S.C. 154(b) by 1071 days.

(21) Appl. No.: 10/590,628

(22) PCT Filed: Feb. 25, 2005

(86) PCT No.: PCT/EP2005/050825
§ 371 (c)(1),
(2), (4) Date: Jun. 19, 2007

(87) PCT Pub. No.: WO2005/082680
PCT Pub. Date: Sep. 9, 2005

(65) Prior Publication Data
US 2007/0276566 A1    Nov. 29, 2007

(30) Foreign Application Priority Data
Mar. 1, 2004    (DE) .......................... 10 2004 010 409

(51) Int. Cl.
*B60R 21/01* (2006.01)

(52) U.S. Cl. ........................ 701/45; 280/735; 280/801.1

(58) Field of Classification Search .................. None
See application file for complete search history.

(56) References Cited

U.S. PATENT DOCUMENTS

| 6,192,305 | B1 | 2/2001 | Schiffmann | |
|---|---|---|---|---|
| 6,272,420 | B1* | 8/2001 | Schramm et al. | 701/72 |
| 6,494,281 | B1* | 12/2002 | Faye et al. | 180/197 |
| 2003/0182041 | A1 | 9/2003 | Watson | |

FOREIGN PATENT DOCUMENTS

| DE | 19811865 | 9/1999 |
|---|---|---|
| EP | 1386805 | 2/2004 |
| WO | 9616846 | 6/1996 |
| WO | 0236401 | 5/2002 |

* cited by examiner

*Primary Examiner* — Michael J. Zanelli

(57) ABSTRACT

The invention relates to a device for determining a tendency to tilt about the longitudinal axis and a tendency to turn about the vertical axis of a vehicle. The detection system is characterized by a lateral acceleration sensor producing a lateral acceleration signal, a yaw rate sensor producing a yaw rate signal, a steering angle sensor producing a steering angle signal, wheel speed sensors producing the rotation signals of the wheels, and which includes a controller which, in response to the steering angle, the steering velocity and the vehicle speed, determines a tendency to tilt about the longitudinal axis of a vehicle and which, in response to the lateral acceleration sensor, the yaw rate sensor, the steering angle sensor and the wheel speed sensors determines the tendency to turn about the vertical axis of the vehicle, and with the controller generating a triggering signal for at least one passenger protection means depending on the extent of these tendencies.

10 Claims, 3 Drawing Sheets

DEVICE FOR DETERMINING A TENDENCY TO TILT

BACKGROUND OF THE INVENTION

The present invention relates to a device for determining a tendency to tilt about the longitudinal axis and a tendency to turn about the vertical axis of a vehicle, using a detection system.

The invention uses the detection of a vehicle's tendency to tilt and a tendency to turn of a motor vehicle, being designed especially to the end that they can be utilized in determining a triggering signal for a passenger protection means.

The term driving stability control (ESP) integrates at least five principles for actively influencing the driving behavior of a vehicle, independently of the driver, by means of predeterminable pressures in individual wheel brakes and by means of intervention into the engine management of the driving engine. The principles concern brake slip control (ABS) intended to prevent individual wheels from locking during a brake operation, traction slip control (TCS) preventing the spinning of the driven wheels, electronic brake force distribution (EBD) that adjusts the ratio of the brake forces between front and rear axle of the vehicle, yaw torque control (YTC) which safeguards stable driving conditions while cornering, as well as roll-over prevention (ARP) ensuring a stable vehicle performance when tendencies of the vehicle to tilt are imminent.

It is known in the art to equip motor vehicles with passenger protection means and in particular inflatable passenger restraint systems such as front airbags for drivers and co-drivers. Likewise side airbags are used in vehicles at an increasing rate. Side airbags detect by way of sensors a side impact of the vehicle. The side airbags are triggered in response to the detected sensor data. Side curtain airbags have become known as a novel type of construction of inflatable restraint systems. They unfold from the ceiling or from an area close to the roof post and expand in a downward direction in front of the side windows of the vehicle, and they are meant to protect occupants in collisions of the vehicle with objects.

The airbag systems are activated based on acceleration and/or pressure information. To begin with, acceleration sensors are required in the area of the vehicle's point of gravity in longitudinal and transverse directions. These sensors are usually positioned in the central airbag control device. In addition, so-called upfront or side sensors, respectively, are necessary in order to sense an impact in a reliable manner. The sensors can be configured as acceleration or pressure sensors. The airbag control device assesses the information and activates the airbag concerned. To prevent faulty triggering, an ingenious crash algorithm is necessary, which takes a triggering decision during the first milliseconds of the impact by means of threshold-value polls and signal-course analyses. The triggering decision must be taken during the first 30 milliseconds approximately in the event of a front impact and during the first 10 milliseconds during a side impact. Therefore, the selection or the determination of the corresponding threshold values represents the major difficulty.

A side impact is reliably detected only when the collision takes place in the area of the existing side sensors (driver and co-driver door and possibly B-column and possibly C-column). If, however, the collision occurs outside these areas, reliable detection is not ensured, and release will be suppressed.

At that time, rollover can only be reliably detected if a roll rate sensor is provided apart from an acceleration sensor that is oriented in the direction of the vehicle's z-axis. This sensor equipment permits reliably detecting rollover of the vehicle (in contrast thereto, driving through a steep turn must be ruled out in a reliable manner) and triggering airbags based on this information.

Apart from the airbags, a reversible seat-belt pre-tensioning system connected to the safety belts is known as a non-inflatable constraint system, the effect of which will reduce the range of the safety belts in the event of a sensor release.

All systems mentioned hereinabove are feasible to find application under these extreme instabilities of the vehicle. Up-to-date passive (airbag) and active (brake systems such as ESP Electronic Stability Program/ARP—Active Rollover Protection) safety systems exist at present independently of each other in their respective characteristics (ARP-WO2002036401, ESP-EP792228 B1). In general, active safety systems are defined based on an energy-based model, when a vehicle tilts or skids. Passive safety systems (e.g. airbag) are activated only after an impact. As this occurs, the complex activation decisions must be taken within a few split seconds.

Therefore, it would be desirable to obtain a quicker and more precise information in order to determine on this basis when the passenger protection means should be triggered. In this arrangement, driving situations should also be detected which, nowadays, do not yet cause activation of the passenger protection means, because the necessary triggering criteria (acceleration among others) would not have been exceeded in the event that rollover is not sensed.

An object of the invention is to improve the activation decisions of the passenger protection means.

SUMMARY OF THE INVENTION

According to the invention, this object is achieved by a device for determining a tendency to tilt about the longitudinal axis and a tendency to turn about the vertical axis of a vehicle. The device uses a detection system that includes a lateral acceleration sensor producing a lateral acceleration signal, a yaw rate sensor producing a yaw rate signal, a steering angle sensor producing a steering angle signal, wheel speed sensors producing the rotation signals of the wheels, and which comprises a controller which, in response to the steering angle, the steering velocity and the vehicle speed, determines a tendency to tilt about the longitudinal axis of the vehicle and which, in response to the lateral acceleration sensor, the yaw rate sensor, the steering angle sensor and the wheel speed sensors determines a tendency to turn about the vertical axis of a vehicle, and with the controller generating a triggering signal for at least one passenger protection means depending on the extent of these tendencies. Herein, the device can be equipped with one or more identical sensors, which either process redundant signals, such as yaw rate sensors, or which are positioned at other locations of the vehicle and gather position-relevant information, such as lateral acceleration sensors.

The idea of the invention involves equipping a device for determining a tendency of the vehicle to tilt about the longitudinal axis and a tendency to turn about the vertical axis of a vehicle using a detection system, which is characterized by a lateral acceleration sensor producing a lateral acceleration signal, a yaw rate sensor producing a yaw rate signal, a steering angle sensor producing a steering angle signal, wheel speed sensors producing the rotation signals of the wheels, and which comprises a controller which, in response to the steering angle, the steering velocity and the vehicle speed, determines a tendency to tilt about the longitudinal axis of the vehicle and which, in response to the lateral acceleration sensor, the yaw rate sensor, the steering angle sensor and the wheel speed sensors determines a tendency to turn about the vertical axis of a vehicle, and with the controller generating a triggering signal for at least one passenger protection means depending on the extent of these tendencies. The invention will now use the information about the driving dynamics of the active safety systems based on lateral acceleration, yaw rate, steering angle, vehicle speed (from the rotation signals of the wheels), in order to make them available to the passive systems (e.g. airbag). Due to the additional pieces of information, these systems are then able, even prior to a possible accident, to take triggering decisions or adapt the triggering algorithms to the respective situation in view of the detected critical driving situation, in order to effect a release in a case of collision in due time and in conformity with conditions. The invention provides combining both systems in such a way that improved safety functions are at disposal and/or costs for components can be saved.

The invention at issue creates an improved safety detection system, which can be employed to define with greater precision when the passenger protection means of the vehicle must be triggered. The safety detection system includes lateral acceleration sensors, a yaw rate sensor, or two yaw rate sensors in the case of a redundant design, as well as a rotational speed sensor for each wheel. A controller defines in a model-based fashion, in response to the quantities of steering angle, steering velocity and vehicle speed, whether the existing steering movement is likely to cause an overturning hazard. If, as this occurs, the lateral acceleration and the yaw rate also exhibit high vehicle dynamics, the ARP-intervention starts. Beside the algorithms for detecting the overturning hazard in a dynamic driving situation, the controller limits also in a quasi steady-state driving the lateral acceleration of the vehicle depending on the driving situation and the ride-height of the vehicle with an active chassis. The controller generates a control signal in response to the detected overturning hazard of the vehicle.

The device uses the same sensors to detect a tendency to turn about the vertical axis of the vehicle (ESP). The device includes one or more yaw rate sensors producing a yaw rate signal that corresponds to a yaw motion of the vehicle;

a vehicle model producing a reference yaw rate signal that corresponds to a desired yaw motion of the vehicle;

a lateral acceleration sensor producing a lateral acceleration signal that corresponds to a lateral acceleration of the vehicle;

a steering angle sensor producing a steering angle signal that corresponds to a steering angle;

a plurality of wheel speed sensors producing wheel speed signals that correspond to each of the four wheel speeds;

if necessary, a longitudinal acceleration sensor or a longitudinal acceleration model producing a longitudinal acceleration signal that corresponds to a longitudinal acceleration of the vehicle. Depending on the vehicle speed and the steering angle adjusted by the driver, the controller determines in the vehicle model a reference yaw rate and compares it with the actual yaw rate. The signals steering angle, vehicle speed, yaw rate, and coefficient of friction are taken into account in the vehicle model. The controller will calculate an additional yaw torque due to the difference between these two values. When the additional yaw torque exceeds defined threshold values, or if the difference between the measured yaw rate and model-based yaw rate is too great, there is the risk of the vehicle turning about the vertical axis. The controller generates a control signal in response to the detected risk of turning of the vehicle.

Consequently, using the ESP controller and the ESP sensor equipment, the invention detects conditions, which are critical in terms of driving dynamics and can cause tilting about the longitudinal axis of the vehicle and/or turning about the vertical axis of the vehicle. These conditions may occur singly or jointly.

If vehicle conditions are so critical that it is impossible to prevent skidding or rollover by way of a brake intervention at individually operable brakes, and/or by an intervention into the engine torque, and/or an intervention into an active steering system of the ESP/ARP system, the information about yaw rate, acceleration and, optionally, steering angle can be supplied to a reversible (e.g. a belt pre-tensioning system) or non-reversible passenger protection means (e.g. airbag). The system utilizes the vehicle state information for adaptively adjusting the release thresholds of the passenger protection means. Thus, it is e.g. possible to lower the release thresholds in the situation 'skidding' which is critical in terms of driving dynamics so that in a following side impact of the vehicle on an object, a non-reversible passenger protection means (e.g. airbag) can be triggered at all, earlier, and/or in an adapted fashion. If tilting of the vehicle cannot be prevented despite the ARP-system (detection algorithms about the use of energy preservation principles or the rate of change of the sensor signals), so that rollover is inevitable, the non-reversible passenger protection means (e.g. airbag) can be activated. This leads to a considerable reduction of the possible consequences of an accident for the occupants of the vehicle.

Advantageously, it can be provided that the triggering signal for a reversible belt pre-tensioning system is allocated to said depending on the driving situation, so that a definition of the position of the pre-tensioning system being actuated in the vehicle and/or the point of release takes place depending on the rollover and/or the turning tendency of the vehicle in space. It is furthermore arranged that the point of time of release of the belt pre-tensioning system being actuated occurs according to the ARP-intervention so that the ARP-intervention and the belt pre-tensioning system are activated simultaneously. In this arrangement, an ARP-controller executes an ARP-intervention on at least one wheel brake and/or an active steering system, and a triggering signal for the belt pre-tensioning system is generated simultaneously. The safety belt is pre-tensioned. When the ARP-intervention is completed, the belt pre-tensioning system can be released again.

ARP-intervention and the generation of the triggering signal for the belt pre-tensioning system may also take place offset in time.

The following scheme can be executed by the controller in a particularly favorable manner:

Step 1: detecting, whether ARP-intervention is necessary

Step 2: activating the belt pre-tensioning system(s) and the ARP-intervention

Step 3: detecting that the ARP-intervention is unsuccessful (no stabilization of the vehicle)

Step 4: activating the airbag.

In such a case, activation of e.g. the airbag would not have occurred based on nowadays triggering decisions because the necessary release criteria, such as the acceleration of the vehicle, would not have been exceeded. This applies under the condition that no roll rate sensor exists.

Advantageously, also the service life of the airbag is adapted based on the information about vehicle dynamics when tilting or rollover of the vehicle is detected. As the action is very slow compared to the front or side impact, the service lives would be extended considerably (to roughly 1 to 3 seconds).

It depends on the driving situation how the non-reversible passenger protection means (e.g. airbag) to be activated are defined.

An essential advantage of this adaptive triggering decision involves that now likewise collisions outside the range of the side sensors can be detected reliably, allowing an activation of the passenger protection means and optimal protection of the passengers also in these cases.

One embodiment is illustrated in the drawings and will be described in detail hereinbelow.

DETAILED DESCRIPTION OF THE DRAWINGS

Figure 1:
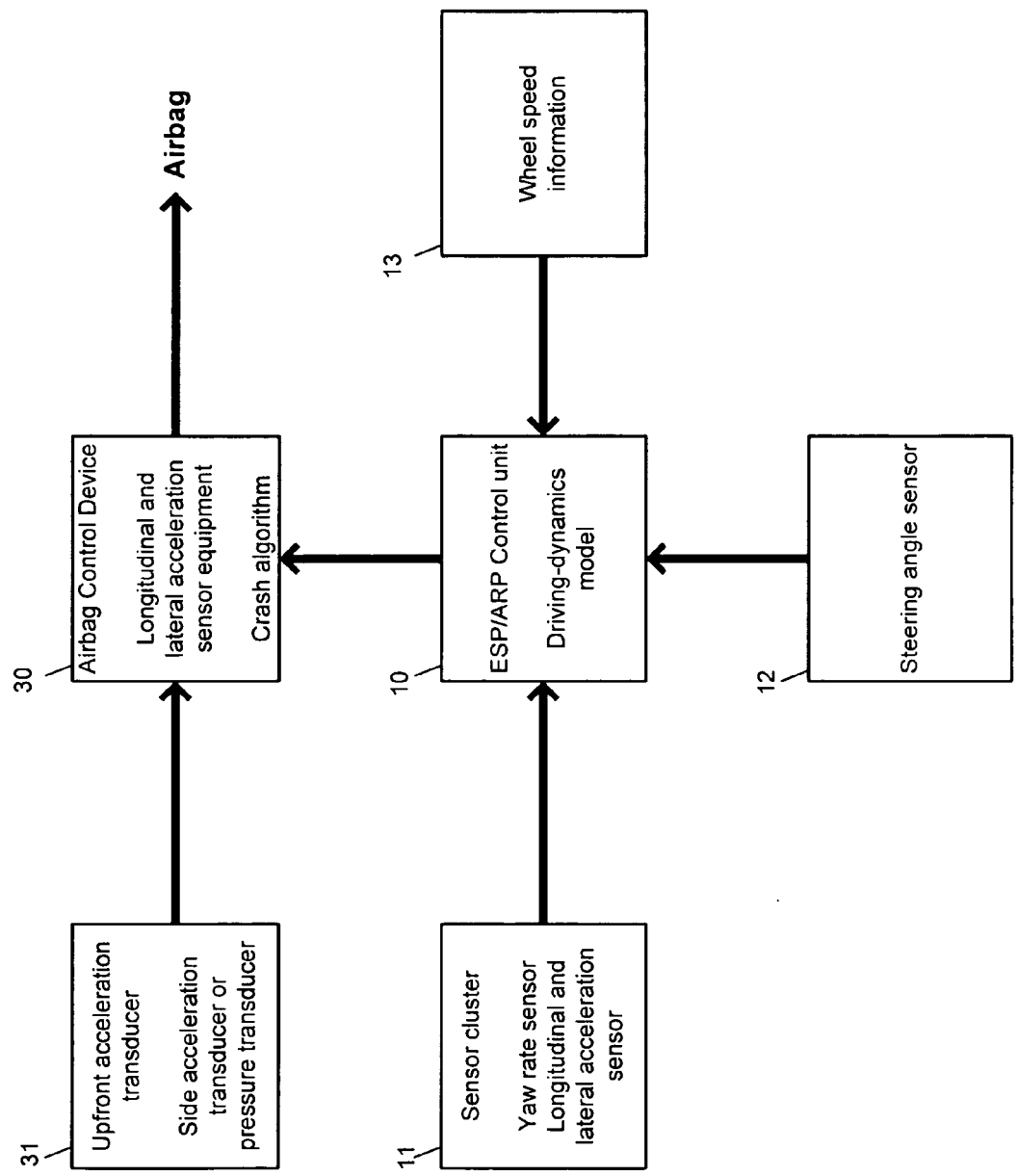
FIG. 1 shows the determining units provided to determine an adaptive triggering decision of the airbag.

FIG. 1 depicts first and second determining units 10, 30 being connected to three detecting units 11, 12, 13, 31. The detecting unit 11 is preferably designed as a sensor cluster comprising at least one yaw rate sensor, a longitudinal acceleration sensor and a lateral acceleration sensor. Instead of the longitudinal acceleration sensor, a longitudinal acceleration model can also be used which is favorably arranged in the detecting unit 11. Although the sensor cluster design provides advantages with respect to the arrangement in the vehicle and the processing of the information gathered by the sensors, the sensors can also be connected separately to the detecting unit 11. The second detecting unit 12 is a steering angle sensor, while the third detecting unit 13 comprises the wheel speed sensors allocated to each wheel of the vehicle. The detecting units 11, 12, 13 detect or measure the yaw velocity, optionally, longitudinal acceleration, lateral acceleration, the steering wheel angle, the steering velocity, optionally the steering angle at the wheels, and the vehicle speed (from the motion of the wheels). This data is supplied to the first determining unit 10, being configured as an ESP and ARP controller. The vehicle model stored in the ESP or GMK controller 10 calculates a specification for the change of the yaw rate based on the steering angle, the vehicle speed and the measured yaw rate. This additional yaw torque determined using the data of the detecting units 11, 12, 13 and being produced from the difference between the yaw rate measured by means of the yaw rate sensor and the reference yaw rate calculated in the driving-dynamics vehicle model forms the basis of the control of the brake actuators.

In the ARP controller of the detecting unit 10, a model-based calculation in the driving-dynamics ARP-model is used to determine from the quantities of steering angle, steering velocity and vehicle speed, whether the steering movement can cause an overturning hazard. The overturning hazard is plausibilised by way of the lateral acceleration and yaw rate. When these signals exhibit high driving dynamics, the value of the model-based calculation being representative of a highly dynamical steering action forms the basis of the control of the brake actuators.

The determining unit 30 connects to the detecting unit 31, which latter includes so-called upfront acceleration transducers associated with the front side and the sides of the vehicle as well as side acceleration or pressure transducers. Data of the detecting unit 31 is sent to the determining unit 30. The latter unit processes data together with the information found in additional longitudinal and lateral acceleration sensors in the event of contact of the vehicle with an object being in its path. The additional longitudinal and lateral acceleration sensors are favorably arranged centrally in the determining unit 30. A crash algorithm is provided in the determining unit 30 for processing the information. Part of the crash algorithm is the program run for the adaptation of the respective driving maneuver, which is shown as an example in FIG. 2. In this respect, at least one threshold value 'a' determining the definition of the triggering decision of the airbag is varied depending on at least one separately determined driving-dynamics quantity out of the determining unit 10. Branching is illustrated as a lozenge. In lozenge 20, the amount of the yaw rate difference |Δψ|>a threshold value k, i.e. the deviation of the vehicle's track, predetermined by the driver by way of the steering wheel and corresponding to the reference yaw rate, from the measured yaw rate exceeds the value k. Thus, a first decision criterion for the modification of the threshold value 'a' of the airbag triggering decision is satisfied. If signal patterns characteristic of an extreme rotation about the vertical axis are then found out by way of the signals' course of the longitudinal and lateral acceleration, the second decision criterion for modification of the threshold value 'a' is satisfied. Situation 21 is considered to prevail, i.e. the threshold value 'a' for triggering the airbag(s) can be adapted to the driving maneuver, meaning 'skidding' of the vehicle in this example. When the decision criteria are not satisfied, situation 22 is considered to prevail. The threshold value is not adapted.

In addition to the yaw rate difference mentioned hereinabove by way of an example, it is also possible to use the measured yaw rate, the steering velocity, the steering angle, and/or the lateral acceleration for driving maneuver detection.

Figure 2:
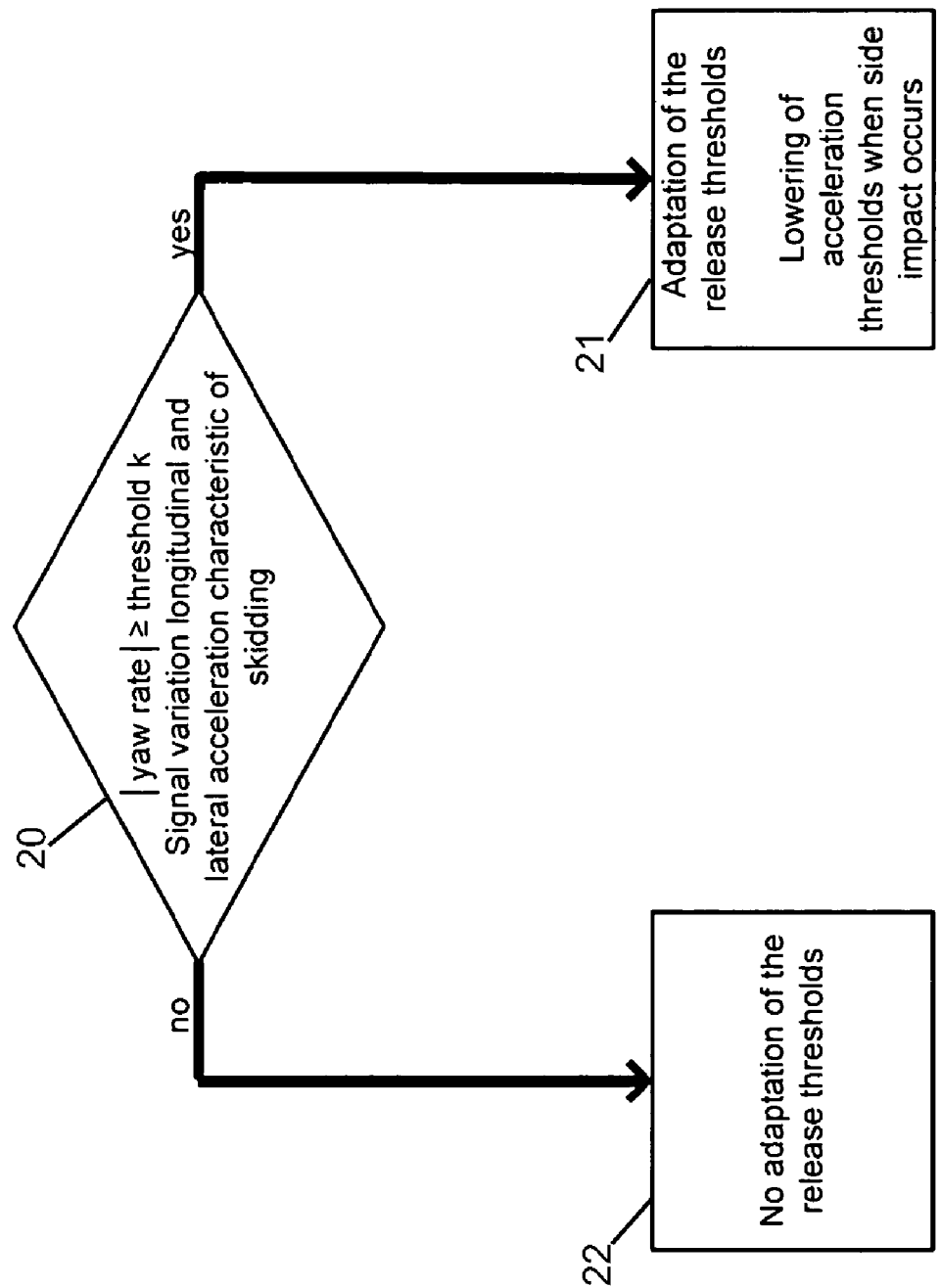
FIG. 2 shows a flow chart to determine the adaptation of the release thresholds in an ESP situation being critical in terms of driving dynamics.

The program run for the adaptation of the respective driving maneuver to the triggering decision of at least one airbag, which is illustrated in FIG. 2 by way of example, is also executed with respect to tilting tendencies in terms of detected driving dynamics quantities of the determining unit 10. The steering angle, the steering velocity and the vehicle speed is then compared exemplarily with threshold values k1, k2, k3 in lozenge 20, and the steering movement is evaluated with respect to an overturning hazard. Once the overturning hazard exceeds a threshold value k4, the vehicle turns over its longitudinal axis and can no longer be stabilized by means of a brake intervention. Hence, a first decision criterion for modifying the threshold value 'a' of the airbag triggering decision is satisfied. When signal patterns characteristic of a high vehicle dynamics about the longitudinal axis are found by way of the signals' course of the yaw rate and the lateral acceleration, the second decision criterion for the modification of the threshold value 'a' is satisfied. Situation 21 is considered to prevail, i.e. the threshold value 'a' for triggering the airbag(s) can be adapted to the driving maneuver, meaning 'tilting' of the vehicle in this example.

Advantageously, the threshold values provided in a front or side impact of the vehicle for the triggering decision are modified when decision criteria of the driving maneuver detection and signal pattern analysis of the airbag are satisfied. In this case, the threshold values for triggering decisions become lower than 30 ms when a front impact is expected, and lower than 10 ms relating to a side impact. The non-reversible passenger protection systems can be triggered in due time when the vehicle collides with an object by selecting or fixing the corresponding threshold values depending on the driving dynamics of the active safety systems, based on yaw rate, steering angle, vehicle speed, steering angle, steering velocity, lateral and optionally longitudinal acceleration.

Apart from modifying the threshold values for the triggering decision of the passenger protection means, it is also possible to adapt the service life of the air bag to the driving maneuver based on the driving dynamics information when tilting or rollover of the vehicle is detected. As the action is very slow compared to the front or side impact, the service lives (duration of the inflated airbag state) would be extended considerably (to roughly 1 to 3 seconds) in such a case.

Also, the possible consequences of an accident for the vehicle passengers could be minimized in the way of:
 a) partial activation/stepped activation (discreet or analog) of at least one airbag
 b) complete activation of at least one airbag.

To determine which airbag will be activated depends on the driving situation.

Figure 3:
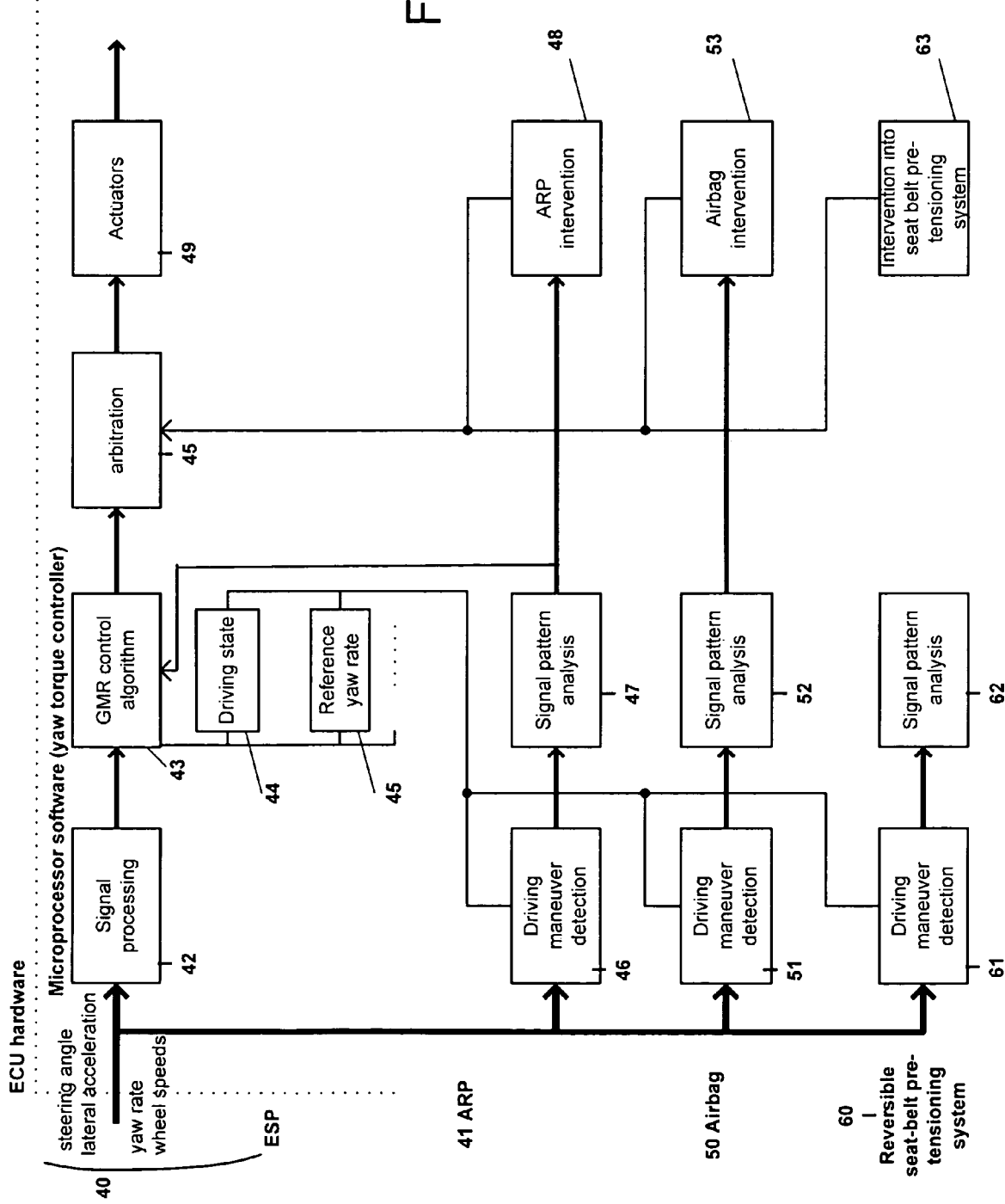
FIG. 3 shows a device according to the invention.

FIG. 3 schematically illustrates the detection system with the device 40 for determining the tendency to turn about the vertical axis of the vehicle and with the device 41 for detecting the tendency to tilt about the longitudinal axis. The principal structure and the function of the device 40 are described in detail in EP 792228 B1 (ESP), the contents of which is part of the present invention. The basic structure and the function of the device 41 are described in WO02/36401 A1, the contents of said publication is likewise part of the present invention. The structure of the detection system is modular. The module ESP controller 40 includes the function units of signal processing 42, GMR-control algorithm 43 with the subsystems driving state 44, reference yaw rate 45, and similar elements, as well as arbitration 45 as is described in detail in EP 792228 B1 referred to hereinabove. The module ARP controller 41 includes the function units of driving maneuver detection 46, signal pattern analysis 47 and ARP intervention 48, as is described in more detail in EP 792228 B1. The module ARP controller 41 is coupled to the function unit of driving condition 44 of the ESP controller, which supplies the driving maneuver detection 46 with the information or the signals, respectively, that permit determining a highly dynamical steering action in 46 and 47, when the driving performance is stable. A tendency to a tilting behavior is concluded when a highly dynamical steering action is detected. If likewise lateral acceleration and yaw rate indicate a high driving dynamics, an ARP-intervention 48 is initiated in at least one brake. The highly dynamical steering action is detected depending on the time variation of the steering angle velocity.

The pressure requirements determined in the ARP-intervention 48 are made available to the arbitration 45.

The airbag control 50 with the function units of driving maneuver detection 51, signal pattern analysis 52 and airbag intervention 53 and the module of belt pre-tensioning system 60 with the function units of driving maneuver detection 61 and signal pattern analysis 62 and belt pre-tensioning system intervention 63 are provided as additional module. The results of the airbag intervention 53 and the belt pre-tensioning system 63 are also supplied to the arbitration 45. It is the task of the arbitration 45 to decide, based on the driving state, which actuators 49 must be driven and in what sequence of time.

The device of FIG. 3 as described hereinabove represents only a principal design which can be modified to the effect that the driving maneuver detection 46, 51, 61 as well as the signal pattern detection 47, 52, 62 can also be designed in one common modular unit. In addition, the driving maneuver detection 46, 51, 61 and the signal pattern detection 47, 52, 62 can be designed as a common unit.

Embodiments

The vehicle comprises a seat occupancy detection (e.g. only the driver is seated in the vehicle), and if tilting to the left vehicle side is detected, then only the side airbag on the driver side (left front) is activated in an embodiment (in left-hand traffic the logic is accordingly different). The intensity of the airbag activation depends on the type of vehicle movement. When tilting to the side occurs slowly, only partial activation/stepped activation could be carried out, while complete activation of at least one airbag is executed in the event of a quick tilting or turnover.

When it is found out in another embodiment that the driver has not buckled up, and quick tilting is detected, all airbags in the front area of the vehicle can be activated completely, because the driver might be tossed upside down in the front compartment and risk of injury is thus very high.

Costs for components can be saved when rollover detection sensors are used in the vehicle, for example. These sensors are no longer required because the ESP sensor equipment can be used. Rollover detection sensors are then needed only in special cases (e.g. in convertibles), when rollover must be identified without doubt and safety roll bars must pop up (no other head protection exists in the vehicle).

The invention claimed is:

1. A device for determining a tendency to tilt about a longitudinal axis and a tendency to turn about a vertical axis of a vehicle, using a detection system comprising:
 a lateral acceleration sensor producing a lateral acceleration signal;
 a yaw rate sensor producing a yaw rate signal;
 a steering angle sensor producing a steering angle signal;
 wheel speed sensors producing rotation signals of respective wheels; and
 a controller which, in response to a steering angle, a steering velocity and a vehicle speed, determines a tendency to tilt about a longitudinal axis of the vehicle and in response to the lateral acceleration sensor, the yaw rate sensor, the steering angle sensor and the wheel speed sensors determines a tendency to turn about a vertical axis of a vehicle, and the controller generates a triggering signal for at least one passenger protection device depending on the extent of these tendencies.

2. A device according to claim 1, wherein the triggering signal is allocated to the passenger protection device depending on a driving situation, so that a definition of a position of the passenger protection device being actuated in the vehicle takes place depending on at least one of a tilt about a longitudinal axis or turning tendency of the vehicle in space.

3. A device according to claim 2, wherein the extent of the tendency to tilt or the tendency to turn is evaluated based on at least one of the quantities of steering wheel angle, steering velocity, vehicle speed, lateral acceleration, longitudinal acceleration.

4. A device according to claim 1, wherein at least one threshold value of the triggering signal is varied.

5. A device according to claim 4, wherein at least a lag of release of the passenger protection device is varied as a threshold value.

6. A device according to claim 1, wherein a service life of the passenger protection device is modified depending on a driving situation.

7. A device according to claim 1, wherein the passenger protection device is an airbag.

8. A device according to claim 1, wherein the passenger protection device is a reversible belt pre-tensioning system.

9. A device according to claim 8, wherein the triggering signal for the reversible belt pre-tensioning system is allocated depending on a driving situation, so that a definition of a position of the pre-tensioning system being actuated in the vehicle or the point of time of release takes place depending on the tilt about a longitudinal axis or turning tendency of the vehicle in space.

10. A device according to claim 9, wherein the point of time of release of the belt pre-tensioning system being actuated occurs according to an ARP-intervention so that the ARP-intervention and the belt pre-tensioning system are activated simultaneously.

* * * * *